INVENTORS
PAUL S. HEBERT
MICHAEL H. SHEARON

BY

Theodore C. Gregory ATTORNEY

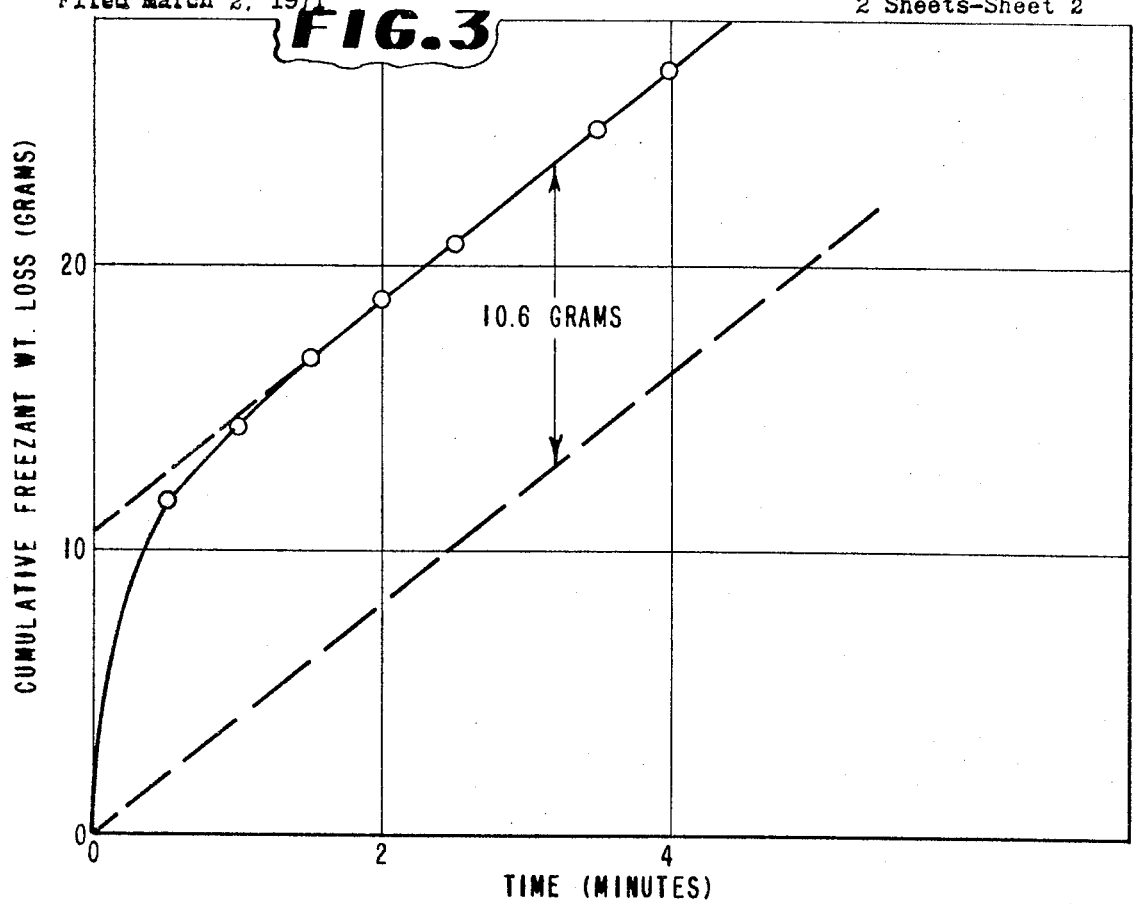
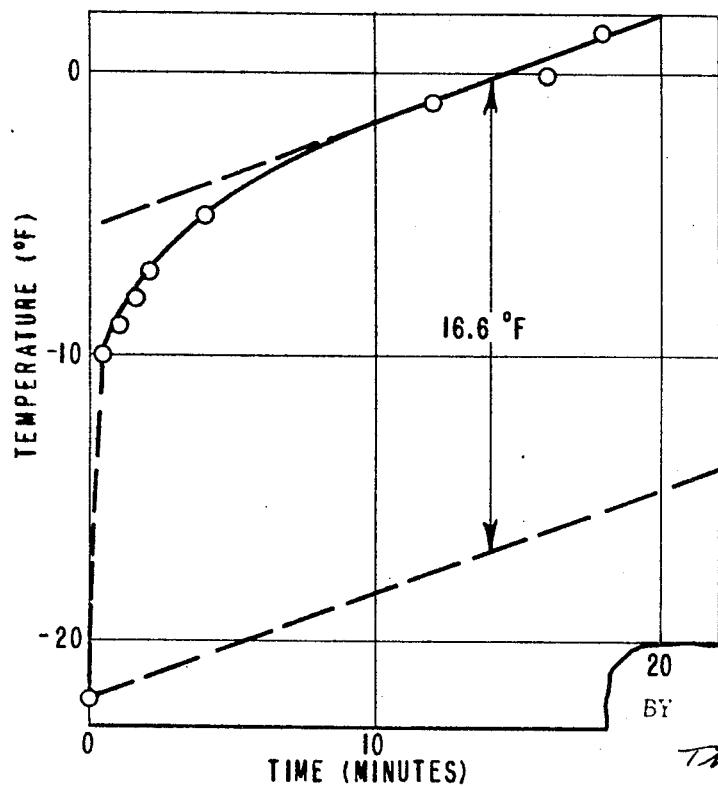

United States Patent Office 3,748,153
Patented July 24, 1973

3,748,153
SURFACE TREATMENT OF FRIED FROZEN FOOD WITH SUPERHEATED STEAM
Paul Sanford Hebert, Wilmington, Del., and Michael Hillas Shearon, Glen Farms, Md., assignors to E. I. du Pont de Nemours and Company, Wilmington, Del.
Filed Mar. 2, 1971, Ser. No. 120,249
Int. Cl. A23b 1/06, 3/06, 7/00
U.S. Cl. 99—193
4 Claims

ABSTRACT OF THE DISCLOSURE

Process of exposing foods frozen by contact with ebullient fluorohalocarbons, whose surfaces comprise maldistributed congealed oils or fats, to superheated steam for from about 0.1 second to about 1 second, which transiently melts and mobilizes said oils or fats thus correcting said maldistribution and restoring the prefreezing appearance of the food, without raising the equilibrium bulk temperature of the food to the freezing transition nor adding more than about 0.6 wt. percent condensed water to the food nor producing a visible water glaze on the food.

BACKGROUND OF THE INVENTION

This invention relates to improvements in the process of particulate food freezing by direct contact between the food and an ebullient liquid fluorinated $C_1$ to $C_4$ saturated halohydrocarbon.

The processes of food freezing which comprise the direct contact of particulate foods with ebullient liquid polyfluorinated $C_1$ to $C_4$ saturated halohydrocarbons as disclosed by Alaburda et al. in U.S. Pat. 3,368,363 and by Waldin in U.S. Pat. 3,498,069, although offering substantial benefits over older methods of food freezing, has one disadvantage for the food processor. The polyfluorohalocarbons freezants, probably by mechanical processes, disturb the normal distribution of oil and fat on the surfaces of particulate foods. It appears that oil or fats are to a small but important degree carried into dispersion in the freezant from which they are redeposited on the food on final evaporation of the freezant. The congealed oils and fats are redeposited on the food in a fine dispersion which confers on the food an undesirable optical effect of whiteness. The effect is especially noticeable on foods of dark color such as fried foods.

The processes of the prior art directed to post-treatment of foods frozen by means other than by direct contact with polyfluorohalocarbons are directed to the correction of whitening due to frost formation. In these processes, energy in the form of warm water, saturated atmospheric pressure steam, or infrared rays are applied to the food to melt the frost which is then allowed to refreeze to a water glaze. The application of the art processes, to the correction of maldistribution of congealed oils or fats, would not result in the correction of the maldistribution. The prior art treatment to supply energy to the frozen food would either be unable to melt fats at all or would do so at the expense of melting a substantial part or even all of the food being treated. This is, of course, undesirable because refreezing of the bulk of the food impairs the quality of the food as in known, and adds to refrigeration costs.

It is known to improve storage stability of frozen meat by providing water and oil-in-water glazes to frozen foods. For example, Keeling in U.S. Pat. 3,368,366 disclosed a device and process for providing liquid water to frozen foods for direct glazing without remelting. Bauer et al. in U.S. 3,406,081 disclosed the freeze coating of frozen meat products by spraying or dipping the frozen meat with 80–100° F. oil-in-water emulsions.

No process for the correction of maldistribution of fats and oils on frozen food surfaces has been disclosed.

SUMMARY OF THE INVENTION

It has now been found that, by very short exposure to superheated steam, it is possible transiently to melt congealed oils and fats on the surfaces of foods frozen by direct contact with an ebullient liquid freezant thus restoring the surface essentially to its pre-freezing appearance, while transferring only trivial amounts of heat to the food. The food surface is not only returned to the pre-freezing condition but also the storage stability of the food is improved as a result of more level distribution of oils and fats on the surface, as is known in the art, without the formation of a visible water glaze. The food surface is not cooked by the superheated steam treatment.

BRIEF DESCRIPTION OF THE DRAWINGS

FIGS. 2 and 3 are graphs of time vs. freezant weight loss of food which has been treated by the invention process.

FIG. 4 is a graph of time vs. the temperature at the mass center of an article of food which has been treated by the invention process.

DESCRIPTION OF THE INVENTION

Figure 1:
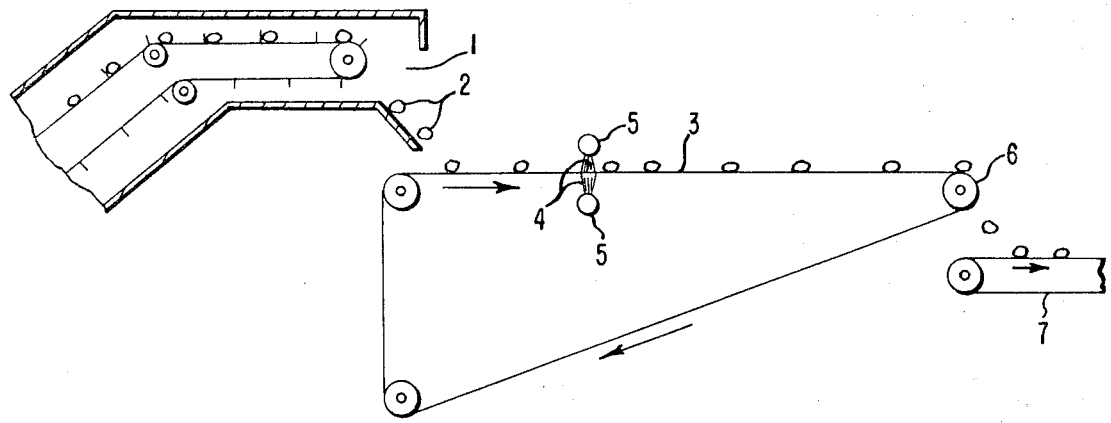
FIG. 1 shows schematically an embodiment of the invention integrated with a prior art food freezing process and device wherein food particles are directly contacted with an ebullient liquid freezant.

Thus in the process of freezing foods by direct contact with an ebullient liquid freezant in an open vessel, it has been found that by exposing the frozen foods to superheated steam at a temperature and for a time sufficient to melt the congealed oils and fats on the surface of said frozen food while maintaining the equilbrium bulk temperature of said frozen food below the freezing transition temperature results in the melting of the congealed oils and fats on the surface of the frozen food such that the surface of the frozen foods is essentially in its prefrozen appearance.

The process of this invention may result in the addition of no more than 0.6% by weight of water to the frozen food. No visible water glaze is present on the surface of the frozen foods as a result of the process of this invention.

As an illustration of the process of this invention, exposure of −22° F. frozen breaded and fried chicken parts weighing about 70 grams to about 360° F. superheated steam for 0.1 to 0.2 second, the preferred condition for particulate foods of this size, results in the melting and redistribution of congealed oils and fats sufficient to constitute a restoration of the surface appearance of the food while transferring only 0.3 B.t.u. or less to the above chicken part with an accumulation of water as ice on the part of only 0.13 wt. percent or less. The transfer of 0.3 B.t.u. corresponds to an equilibrium bulk temperature rise of 4.6° F. Thus food frozen to a temperature at least about 5° F. below its freezing transition will not be brought to its freezing transition. Since foods are normally stored at 0° F., it is important that the process of the invention not bring the equilibrium bulk temperature of the food above that temperature in order to avoid additional refrigeration load on cold storage facilities. The principal application of the instant invention is post-treatment of food frozen to 5° F. or less by direct contact with ebullient dichlorodifluoromethane. The equilibrium bulk temperature of food frozen in this manner will rise under preferred conditions to a temperature of 0° F. or less, which is within recommended storage temperature range.

The term equilibrium bulk temperature rise is defined as the temperature rise the food article would experience on adiabatic temperature equilibration. The equilibrium bulk temperature is the temperature to which food equilibrates. The term freezing transition temperature is defined as the temperature range over which foods freeze and thaw. Since foods do not have sharp melting points but freeze and thaw over a range of temperature, say about 4° F., sometimes more, the term freezing transition temperature is preferred over freezing point. Most foods freeze at about 28° F.

Most commonly the process of this invention will be used for the treatment of frozen solid foods. Solid foods that may be frozen and treated in accordance with this invention include cooked and uncooked foods having congealed oil and fats on their surface and including breaded and not breaded meats such as beef, pork, veal, lamb and fowl; seafood such as fish and shellfish; and vegetables such as onions, onion rings and potatoes.

The process of the invention is also operable at slightly lower steam temperatures and slightly longer exposure times with, however, a penalty in heat transferred to the food and consequent temperature rise as well as greater amounts of accumulated water as ice. However, the process still meets the criterium of no increased load on warehouse refrigeration and the equilibrium bulk temperature remains well below the freezing transition. For example, 1 second exposure of about 70 grams frozen breaded and fried chicken parts to 340° F. steam transferred about 1.2 B.t.u. to the parts with a calculated temperature rise of about 19° F. and with accumulation of about 0.5 wt. percent water as ice on the part.

The process of this invention results in a very thin melted surface layer, estimated in beef steak, from the width of a thin red line seen in cross section, at less than $\frac{1}{32}$ inch for preferred exposures, which refreezes readily in not more than about 3 seconds. This is more readily appreciated when it is considered, for example, that of the about 5.6 B.t.u. removed from a 70 gram chicken piece to bring it through the frozen region from its melting transition, assumed to be 28° F., down to a temperature of —22° F., only about 5% of the B.t.u. removed is returned to the piece under preferred exposure conditions. The heat capacity of the chicken parts in the below the freezing transition temperature range is about 0.4 with respect to water.

Superheated steam can be applied to frozen food in various ways as will occur to the engineer. Superheated steam, since it behaves as a gas, does not have a shadow effect to nearly the degree of prior art processes such as for example infrared rays. Areas somewhat outside line-of-sight, as, for example, the undercut edges of pieces, are treated. For best results, however, it is preferred to apply steam to the top and bottom of the parts being treated. In the preferred embodiment, food is carried on a foraminous belt through steam curtains provided by jets mounted above and below the belt. The jets mounted rowwise in manifolds so as to cover the width of the belt are mounted about ½ inch above the nearest food surface and about ½ inch below the belt. In order better to control exposure time, the jets are designed to produce a narrow curtain about ½ inch wide through which the food is carried. It is further preferred that the food be exposed to moving steam as from a jet as opposed to more-or-less static steam as, for example, in a steaming enclosure. Moving steam sweeps away air surrounding the food and improves heat transfer.

There is a sharp temperature drop when the steam leaves the nozzle. For example, steam, at about 700° F. ½ inch inside the nozzle has a measured temperature of about 360° F. ½ inch away at impingement on the food. Temperatures of at least 900° F. inside the nozzle are also operable.

The exposure time is fixed by the belt speed and by the width of the steam curtain. Belts speeds from 3 feet/ min. to at least 40 feet/min. are operable. Exposure times are calculated as the residence time of a point on a food piece in the ½ inch wide stream curtain. In order to permit very high belt speeds, two or more steam curtains may be employed. The steam may be generated and superheated by any of the art methods. A hood is placed over the treating area to carry off excess steam.

In operation under any of the above cited conditions the steam is invisible in the region of the food. The dry frost-free food passes on the belt into the steam curtain where, especially in dark colored food such as fried chicken, the appearance is seen to be suddenly restored to the pre-freezing appearance. There is no frost formation nor is any free water visible on the food. In an instant as the food moves away from the curtain a slight change in the surface appearance indicates that the surface has refrozen. The food is dry and because there is so little water condensed on the surface, the food does not freeze to the belt but falls cleanly therefrom as the belt passes over a sprocket at the end of the run. The food is then carried away for packaging or brought directly to storage.

The process of the invention is conveniently operated continuously in connection with the freezing devices of Waldin illustrated in U.S. Pat. 3,498,069. The process of this invention may be further illustrated by the drawing in FIG. 1.

Referring now to FIG. 1, number 1 is the exit opening of a Waldin device. Essentially frost-free particulate food 2 drops to foraminous belt 3 which carries it through superheated steam curtain 4 directed to the food from above and below the foraminous conveyor belt 3 from nozzles in superheated steam manifolds 5 which extend across the width of foraminous belt 3. During the free run to the drop-off point at sprocket 6 the surface of particulate food 2 refreezes. A conveyor system 7 not part of the invention, carries the finished food to packaging or directly to storage. A ventilation hood not shown carries away excess steam.

More than one pair of manifolds with nozzles 5 may be employed. A variable-speed drive mechanism not shown permits variation in the speed of foraminous belt 3.

The examples that follow further illustrate the invention. In all examples the food surfaces were restored essentially to the pre-freezing appearance. The steam pressure inside the steam manifold in the examples presented was about 4 pounds per square inch gage.

In the first three examples breaded and fried chicken parts, frozen in different ways, were treated in a laboratory device comprising an 8 inch wide foraminous conveyor belt of stainless steel mesh. The device, operated at various belt speeds, employed one steam curtain, i.e., one manifold with jets above the belt ½ inch above the chicken parts and one manifold ½ inch below the belt. Three pounds of steam per hour were delivered to the steam curtain which was ½ inch wide on impingement on the food. In the examples all steam temperatures are measured ½ inch from the nozzle and the nearest frozen food was located at ½ inch from the nozzle.

EXAMPLE 1

In this example, the amount of heat transferred to the parts by the process of the invention was measured directly by the method of Dastur et al. essentially as described in Product Licensing Index No. 72, April 1970, page 19.

A breaded and fried drumstick and a thigh were separately frozen to —22° F. by immersion in ebullient dichlorodifluoromethane until ebullition at the drumstick and the thigh stopped and then removed and quickly weighed, and passed on the foraminous belt of the above-described device through a 360° F. superheated steam curtain.

Each of the pieces were transferred at once to ebullient dichlorodifluoromethane in an insulated open-top container on the pan of a sensitive balance. The gross weight was followed with time essentially according to the method of Dastur et al. The gross weight of the container, dichlorodifluoromethane and frozen food was followed until the rate of weight loss was constant.

Figure 2:
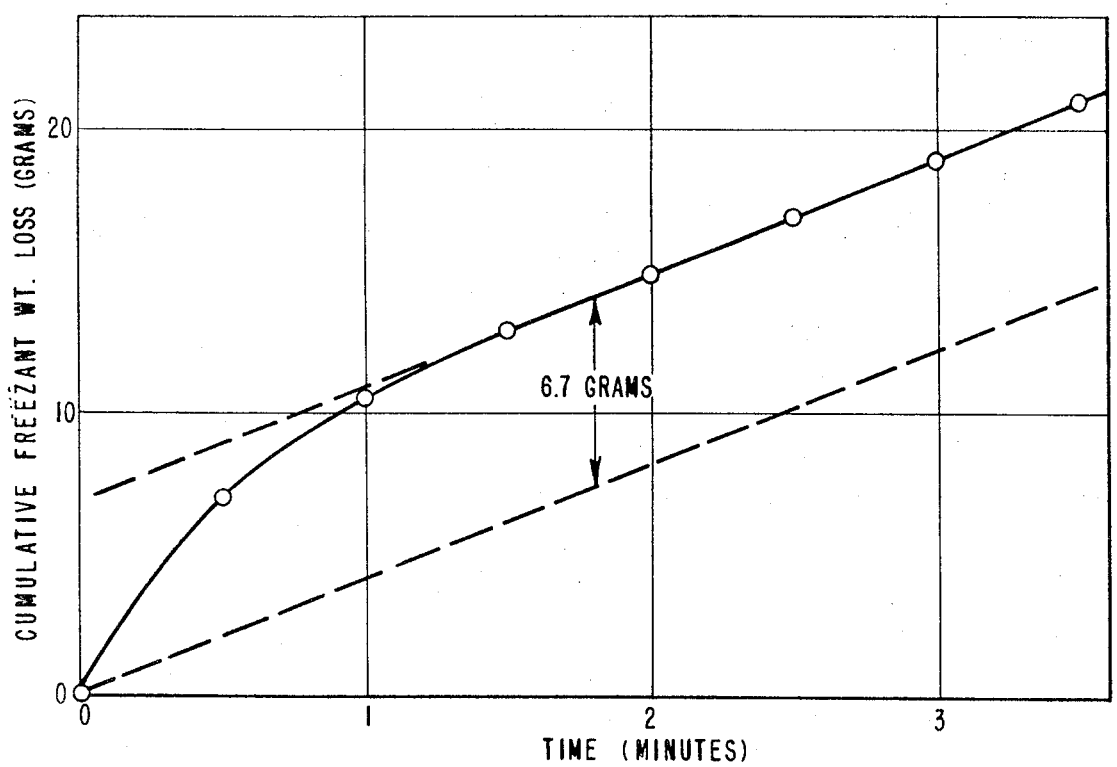

Measured cumulative freezant weight losses versus time are represented by the solid lines of FIGS. 2 and 3. The straight portions of the solid lines represent the constant evaporative weight loss of freezant due to heat gain from the surroundings. The dotted lines passing through the origin are parallel to the solid lines and represent the evaporative weight loss of freezant which would have occurred had the chicken parts transferred no heat to the freezant; that is had the equilibrium bulk temperature of the parts been exactly $-22°$ F., the boiling point of the freezant, as they were before passing through the steam curtain.

Therefore, the vertical distance between the parallel lines is a direct measure of the amount of freezant evaporation required to return the parts to their original thermal condition, i.e., the amount of heat transferred to the parts by the steam curtains.

The lengths of the vertical lines show that 6.7 grams of dichlorodifluoromethane was evaporated to return the 75.5 gram drumstick to its pretreatment thermal condition and the 157.8 gram thigh evaporated 10.6 grams. Since the heat of vaporization of dichlorodifluoromethane at its boiling point is 39.47 cal./gram, multiplication and conversion of units shows that the drumstick accepted 1.05 B.t.u. and the thigh 1.66 B.t.u. Since the heat capacity of chicken parts in this temperature region is about 0.4, the approximate temperature rise and final equilibrium bulk temperature can be calculated with the following results:

| | Temperature change due to steam, °F. | Equilibrium bulk temperature after treatment, °F. |
|---|---|---|
| Drumstick | 15.8 | -6.2 |
| Thigh | 12.2 | -9.8 |

The importance of the above figures is that the superheated steam treatment did not raise the equilibrium bulk temperature above the 0° F. food storage temperature and did not raise the temperature of the frozen food to its freezing transition temperature. The undesirable appearance of congealed oils and fats on the surface of the frozen chicken after the superheated steam treatment had disappeared and the appearance of the frozen chicken was restored to the appearance before freezing.

EXAMPLE 2

Direct measurement of the equilibrium bulk temperature rise and equilibrium bulk temperature of a frozen breaded and fried chicken wing due to the superheated steam treatment of this invention A thermocouple was inserted in the approximate mass center of a 72.5 gram breaded and fried chicken wing. The wing was frozen by immersion in a bath of ebullient dichlorodifluoromethane and thereafter removed and passed through a 360° F. steam curtain by the procedure of Example 1 except that the belt speed was 3 feet/min. corresponding to an exposure time of 1 second.

Immediately thereafter, the piece was suspended in the cold vapors over the ebullient dichlorodifluoromethane bath. The temperature of the vapors varied from 8° F. to 12° F. from beginning to end of the experiment. The temperature of the part was followed with time by means of the thermocouple. The results are shown graphically in FIG. 4. The solid line shows the temperature of the part with time. The straight portion of that line shows the temperature rise of the part due to heat exchange with the dichlorodifluoromethane vapors. The straight dotted line is parallel to the straight portion of the data line and indicates the temperature behavior the part would have shown had it not absorbed heat in the invention process. The temperature difference between the two straight lines is the temperature rise due to the invention process. That quantity is 16.6° F. and, since the part was originally at $-22°$ F., the boiling point of dichlorodifluoromethane, the equilibrium bulk temperature is calculable as $-5.4°$ F. Extrapolation of the straight section of the data line to zero time yields an estimated equilibrium bulk temperature of $-5.7°$ F. thus confirming the value of 0.4 heat capacity used in the above calculation of equilibrium bulk temperature.

The condition of the chicken as a result of the superheated steam treatment had restored the condition of the chicken to the pre-frozen appearance. The congealed oils and fats noticeably visible after freezing no longer were present.

As is known, it is extremely difficult to obtain accurate adiabatic temperature measurements because of heat exchange between the object being measured and the surroundings. The measured temperature values are internally consistent as their plotted values fall on a smooth line. The accuracy of the set is probably within ±4° F. The results are consistent with other estimates.

EXAMPLE 3

In this example the amount of water transferred to frozen chicken parts under various conditions of the process of this invention was measured. From the weight of transferred water and assumption of a heat capacity of 0.4 in chicken parts, the amount of heat transferred, the bulk equilibrium temperature rise, and the equilibrium bulk temperature were estimated by classical thermodynamic calculations.

Breaded and fried chicken parts enclosed in polyethylene terephthalate bags were frozen to $-22°$ F. by immersion in ebullient dichlorodifluoromethane of the bag containing the chicken parts. The frozen parts were quickly weighed and then passed through the superheated steam curtain as described in Example 1 and then quickly reweighed to determine the weight of condensed water. Freezing of the chicken parts by direct contact with ebullient dichlorodifluoromethane would have introduced error into the determination of added water to the chicken parts because of the occluded dichlorodifluoromethane that is carried out of the bath with the chicken parts that would vaporize under the conditions of this example.

Table I shown below summarizes the results obtained. The chicken parts frozen to 0° F. were frozen to that temperature in an ordinary storage freezer and were not enclosed in bags.

The amount of heat transferred to the parts was calculated from the equation $$(1) \quad Q = \frac{E + 159.4 - 0.48 T_3}{\frac{454}{W'_1} + \frac{544}{W'_2}}$$

which was derived by combination and rearrangement of the equations $$(2) \quad Q = W_1[E + h_1 + h_2(32 - T_2)]$$

$$(3) \quad T_2 = T_3 + \frac{Q}{W_2 h_3}$$

Constants were inserted to place $W_1$ and $W_2$ in gram units.

$E$ = Enthalpy of saturated water vapor at the temperatures of the examples from Mollier water vapor chart (B.t.u.)
$h_1$ = Heat of fusion of water (B.t.u.) per pound (144 B.t.u.)
$h_2$ = Heat capacity of ice (0.48 B.t.u./F.°/lb., aver. value 32° F. to $-25°$ F.)
$h_3$ = Heat capacity of chicken part (0.4)
$Q$ = Heat transferred to chicken parts (B.t.u.)
$T_1$ = Temperature of superheated steam at the part (F.°)
$T_2$ = Final temperature of the part F.°) (Equilibrium bulk temperature)
$T_3$ = Original temperature of the frozen part (F.°)
$W_1$ = Wt. of condensed water (pounds)

$W_2$=Wt. of chicken part (pounds)
$W_1'$=Wt. of condensed water (grams)
$W_2'$=Wt. of chicken part (grams)

The results are shown in Table I.

TABLE I

| Part | Orig. temp. of food (°F., $T_3$) | Wt. of food part (g., $W'_2$) | Temp. of steam (°F., $T_1$) | Exp. time (sec.) | Wt. of cond. water (g., $W'_1$) | Wt. of cond. water (percent) | Heat trans. (B.t.u., Q) | Equil. Bulk temp. rise (°F.) | Belt speed (ft./min.) |
|---|---|---|---|---|---|---|---|---|---|
| Drumstick | 0 | 76.90 | 340 | 1 | 0.42 | 0.54 | 1.26 | 18.6 | 2.7 |
| Do | 0 | 64.44 | 340 | 1 | 0.38 | 0.59 | 1.14 | 20.1 | 2.7 |
| Do | 0 | 58.85 | 340 | 1 | 0.20 | 0.34 | 0.60 | 11.6 | 2.7 |
| Do | 0 | 78.86 | 360 | 0.4 | 0.19 | 0.24 | 0.58 | 8.3 | 6.0 |
| Do | 0 | 71.02 | 360 | 0.4 | 0.21 | 0.29 | 0.64 | 10.2 | 6.0 |
| Do | 0 | 89.61 | 360 | 0.2 | 0.11 | 0.12 | 0.34 | 4.3 | 12.0 |
| Do | 0 | 87.66 | 360 | 0.2 | 0.10 | 0.11 | 0.31 | 4.0 | 12.0 |
| Do | −22 | 67.76 | 360 | 0.4 | 0.29 | 0.43 | 0.90 | 15.1 | 6.0 |
| Do | −22 | 70.12 | 360 | 0.4 | 0.24 | 0.34 | 0.74 | 12.0 | 6.0 |
| Thigh | −22 | 124.55 | 360 | 0.4 | 0.32 | 0.26 | 0.99 | 9.0 | 6.0 |
| Do | −22 | 111.23 | 345 | 0.4 | 0.35 | 0.31 | 1.08 | 11.0 | 6.0 |
| Wing | −22 | 65.55 | 360 | 0.4 | 0.18 | 0.27 | 0.56 | 9.7 | 6.0 |
| Do | −22 | 73.81 | 360 | 0.4 | 0.23 | 0.31 | 0.71 | 10.9 | 6.0 |
| Pullybone | −22 | 62.73 | 360 | 0.4 | 0.20 | 0.32 | 0.62 | 11.2 | 6.0 |
| Drumstick | −22 | 68.92 | 360 | 0.2 | 0.09 | 0.13 | 0.28 | 4.6 | 12.0 |

EXAMPLE 4

The procedure of Example 1 was followed except that the process was scaled up with the formaminous belt being scaled up to 30 inches wide. Eighteen hundred pounds of frozen fried chicken parts per hour were treated successfully. Steam curtains were supplied by two pairs of manifolds, each pair delivering about 50 lbs. of steam per hour at about 360° F. in ½ inch curtains at the chicken part. The process was operable at belt speeds of at least 40 feet per minute corresponding to an exposure time of 0.13 second. The temperature rise of a part was less than 4.6° F. The added water was less than 0.13% by weight. There was no visible water glaze and no bulk melting of the pieces nor did the superheated steam treatment cook the part. The appearance of the chicken part was restored to their pre-frozen condition. The congealed oil and fats visible on the surface of the frozen chicken parts were no longer present after the treatment by the process of this invention.

The frozen foods of this invention include those whose surfaces comprise, after freezing by direct contact with ebullient fluorohalocarbons, maldistributed congealed oils and fats.

The foregoing detailed description has been given for clarity of understanding only and no unnecessary limitations are to be understood therefrom. The invention is not limited to exact details shown and described for obvious modifications will occur to one skilled in the art.

What is claimed is:

1. The process of treating frozen food selected from the group consisting of meat, seafood, and vegetables, and which exhibits white surfaces due to the presence of congealed oil or fat and which has been obtained by contacting an oil- or fat-containing food with an ebullient liquid fluorinated $C_{1-4}$ saturated halohydrocarbon, said process comprising contacting the surfaces of the frozen food with superheated steam at a temperature and for a time sufficient to melt the congealed oil or fat while maintaining the equilibrium bulk temperature of the frozen food below its freezing transition temperature.

2. The process of claim 1 wherein the weight of water added during the treatment and retained as ice by the frozen food is not more than 0.6% of the weight of the frozen food before treating.

3. The process of claim 1 wherein the temperature of the superheated steam contacting the surfaces is about 360° F.

4. The process of claim 3 wherein the superheated steam contacts the surfaces for about 0.1–1 second.

References Cited
UNITED STATES PATENTS

| | | | |
|---|---|---|---|
| 2,825,652 | 3/1958 | Berkowitz | 99—194 |
| 3,486,345 | 12/1969 | Waldin | 99—198 |
| 3,592,659 | 7/1971 | Clancy | 99—192 |
| 2,495,435 | 1/1950 | Welch | 99—1 |
| 255,185 | 3/1882 | Nichols | 34—37 |
| 3,266,559 | 8/1966 | Osborne et al. | 34—37 |
| 2,977,203 | 3/1961 | Sienkiewicz et al. | 99—DIG. 4 |
| 3,059,442 | 10/1962 | Ellis | 99—198 |

NORMAN YUDKOFF, Primary Examiner

C. P. RIBANDO, Assistant Examiner

U.S. Cl. X.R.

99—194, 195, 198, 216